United States Patent
Blaschke

[15] 3,689,113
[45] Sept. 5, 1972

[54] COUPLING FOR PIPES
[72] Inventor: Kurt Blaschke, Dudweiler, Germany
[73] Assignees: Elisabeth Hochstrasser, geb. Wack, Kobenhuttenweg, Saarbrucken, Germany; Jurgen Hochstrasser, Kobenhuttenweg, Saarbrucken, Germany; Firma Stahl-und Apparatebau Hans Leffer G.m.b.H., Dudweiler/Saar, Germany

[22] Filed: Feb. 27, 1970
[21] Appl. No.: 14,996

[30] Foreign Application Priority Data
March 3, 1969 Germany..........P 19 11 697.3

[52] U.S. Cl. .....................285/90, 285/330, 285/321, 285/DIG. 14
[51] Int. Cl............................................F16l 15/00
[58] Field of Search.......285/DIG. 14, 330, 321, 404, 285/90

[56] References Cited
UNITED STATES PATENTS

| | | |
|---|---|---|
| 2,913,261 | 11/1959 | Matchett............285/DIG. 14 |
| 3,345,085 | 10/1967 | Hones.....................285/374 X |
| 3,424,477 | 1/1969 | Putch et al...............285/81 X |
| 2,353,572 | 7/1944 | Kuster et al............285/330 X |

FOREIGN PATENTS OR APPLICATIONS

| | | |
|---|---|---|
| 475,813 | 8/1951 | Canada...............285/DIG. 14 |
| 1,491,240 | 7/1967 | France |

*Primary Examiner*—Dave W. Arola
*Attorney*—Karl F. Ross

[57] ABSTRACT

This relates to couplings for pipes, especially boring pipes, where there is a requirement for a coupling which can be easily released yet provides for one pipe to be locked so as not to be able to rotate with respect to the other and also where the coupling is provided with a sealed joint, the coupling is made by intermeshing teeth or cogs on the ends of the pipes, the teeth being trapezoidally shaped so as to provide improved locking between the adjacent pipes; annular sealing rings may be provided on the inside of the teeth, the rings may have a seal between each other or between a ring and next of the adjacent pipe; an annular fastening ring is provided to fit in a recess formed circumferentially around the teeth.

10 Claims, 5 Drawing Figures

Inventor:

PATENTED SEP 5 1972

Inventor:

COUPLING FOR PIPES

FIELD OF THE INVENTION

This invention relates to a releasable pipe coupling which is applicable to boring pipes used in the production of bearing foundation piles.

BACKGROUND OF THE INVENTION

In the production of "pressed" concrete foundation piles, individual boring pipe sections have been welded to each other because they must be sealed throughout in an air-tight and water-tight manner. On site welding and cutting operations on the boring pipes are however time-wasting and uneconomical.

Releasable pipe coupling is already known, the coupling being achieved by means of screws. Since a multiplicity of screws is needed for transmission of the peripheral forces of several hundred tons, this method of connection is hardly suitable, because of the time taken for assembly.

Other releasable pipe couplings are also known, in which the pipes to be coupled have their extremities equipped with rings of teeth or cogs of rectangular shape, which intermesh upon assembling the pipes; such known pipe couplings are endowed on the outer sides of the rings of cogs with recesses complementing each other to form a circumferential groove intended to receive a spring ring or circlip, so that the pipe coupling does not project beyond the uninterrupted pipe diameter. These known pipe couplings, which are advantageous in their handling characteristics, are applicable only to a limited extent however for boring pipes for the production of foundation piles, since they have the disadvantage of lacking the required hermeticity. The butt joints between the pipes must be absolutely hermetic in the production of pressed concrete piles, as well as in the case of well boring. Since the rings of cogs of the known pipe coupling possess cog or tooth flanks extending at right angles, a narrow gap is always necessary between the individual cogs of the intermeshing rings of cogs so that the rings of cogs may be brought into mutual engagement. This gap however mandatorily implies a leak, which must be prevented. The known rings of cogs have the further disadvantage, in view of the existing gap, that a relatively rapid wear of the rings of cogs must occur under violent partial rotation of the pipe with a peripheral force of several hundred tons. Since these violent partial rotations of the pipe occur in counterclockwise and clockwise senses, very rapid wear of the cogs and thus an increasing lack of hermeticity arise.

OBJECT OF THE INVENTION

The object of the present invention is to eliminate or reduce the aforesaid disadvantages.

SUMMARY OF THE INVENTION

The present invention comprises a releasable coupling for boring pipes wherein mutually opposed extremities of the boring pipes are provided with intermeshing cogs, wherein the cogs on their outer sides have recesses complementing each other to form a circumferential groove intended to receive a circumferential fastening means, wherein the cogs taper so that the circumferential width of the cogs is less at the tip then that of the root and wherein the gap between each adjacent cog on one extremity is substantially the same size as the cog of the opposed extremity whereby the flanks of opposing cog can be fitted together so as to be fully in contact.

Thanks to the tooth flanks wrought according to the invention, assembling the coupling brings the flanks of the two rings of cogs into full areal contact with each other, so that the joint acquires the required hermeticity by virtue of this fact. Wear is inhibited during application of torque to the pipe in alternately opposite senses, since there is no gap between the cogs of the two rings of cogs and the initial hermeticity established by the flank configuration of the cogs is retained in practice. Another feature resides in that a sealing element of annular shape is situated on the inner sides of the rings of cogs to seal the joint in an air-tight and water-tight manner.

In a further development of the invention, the sealing element may consist of two steel rings extending up to half the height (axial length) of the cogs. The two mutually opposed end faces of the steel rings practically bear on each other after the joint has been assembled, and thus represent a complementary sealing area, whose action may be improved further by means of a sealing ring which is inserted, according to the invention, in a groove wrought in the end face of one steel ring.

The sealing element may also consist of a steel ring secured on one set of cogs along the height of the cogs, and of a step machined in the other ring of cogs and receiving the extremity of the steel ring. At the same time, a groove receiving a sealing ring is wrought in the lateral surface of the machined step. When the joint is closed, the steel ring engages with its front extremity over the inserted sealing ring and thus equally forms an air-tight and water-tight seal for the joint.

A further feature resides in that the rings of cogs have trapezoidal cogs whereof the flanks have an inclination of between 3° and 20°. The inclination or taper of the cog flanks between the limits specified ensures that no axial stress is exerted on the snap ring when, a tangential impact is imparted to the pipe.

The invention is further characterized in that a stop preventing a relative displacement of the snap ring with respect to the rings of cogs is arranged on the periphery of the pipe. In this connection, it is essential for the stop to consist of at least one projection protruding from the snap ring parallel to the axis of the pipe, which engages in an appropriate recess of the ring of cogs. A modified form is characterized in that at one extremity at least of its slit, the snap ring has a bore for reception of a countersunk screw intended to receive a screw for fastening the same to the ring of cogs. It is also essential in respect of the invention, in the case of thin-walled pipes, for the internal diameter of the joint to be smaller than internal diameter of the pipe. It is of importance moreover, in the case of double-walled pipes, for the internal pipes to be arranged in such manner that their end sides are almost in contact after the pipe coupling has been assembled.

DESCRIPTION OF THE DRAWING

In the accompanying drawing:-

FIG. 3 shows an enlarged partial section corresponding to FIG. 1 while

SPECIFIC DESCRIPTION

Figure 1:
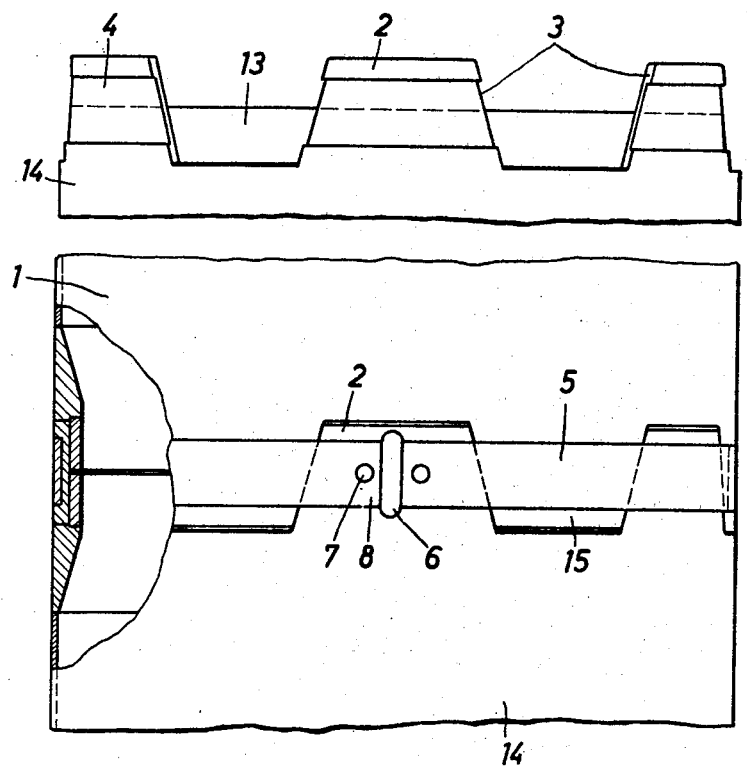
FIG. 1 shows the elevation of the pipe coupling and the illustration of the ring of cogs of the lower pipe section.
Figure 2:
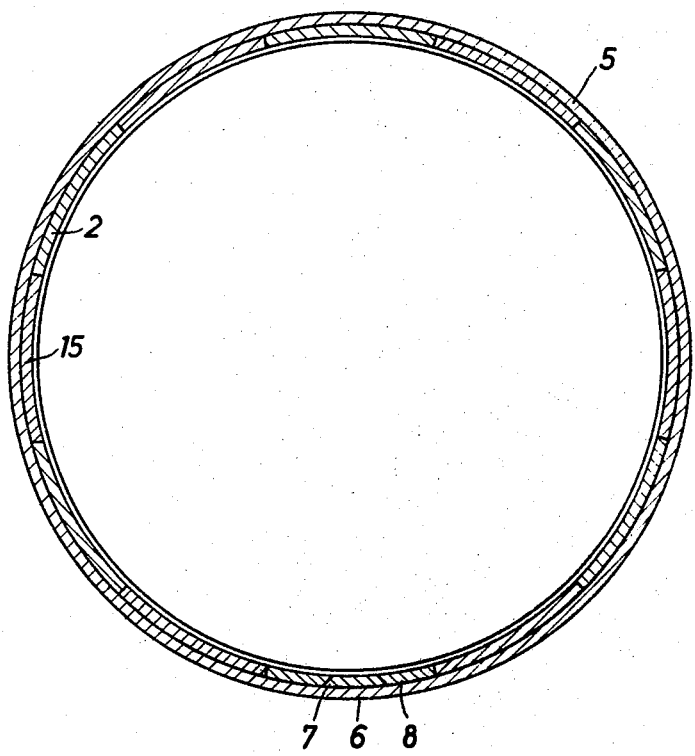
FIG. 2 shows the cross-section corresponding to FIG. 1.

In carrying the invention into effect according to one convenient mode by way of example, the figures show an upper pipe 1 and a lower pipe 14 which have their extremities equipped with corresponding rings of cogs or teeth 2 and 15. As apparent from FIG. 1, the cogs of both rings of cogs 2 and 15 are trapezoidally wrought with tapering flanks 3. As apparent from FIG. 1, the flanks 3 of the two rings of cogs 2 and 15 are in full areal contact in the assembled condition. In the outer sides of the rings of cogs 2 and 15 are wrought recesses 4 which, upon assembling the joint, result in a circumferential groove 4, in which is inserted a spring or snap ring 5. To prevent a radial motion of the snap ring 5 in the groove 4, the snap ring 5 is equipped at either side with projections 6 which engage in corresponding recesses of the groove, so that the snap ring 5 is held in position in the groove 4. The snap ring may also have its extremities 8 endowed with bores 7 into which may be inserted recessed screws 7a which immobilize the snap ring 5 in the groove 4. As apparent from FIG. 3 in particular, the internal diameter of the pipe extremities 1 and 14 is smaller than the internal diameter of the pipe. This measure is necessary particularly in the case of thin-walled pipes, since the snap ring, the cogs and the complementary rings 9 and 13 could not otherwise be accommodated within the wall thickness of the pipes. These steel rings 9 and 13 are welded to the pipe portions 1 and 14 and each extend approximately up to half the height of the cogs 2 to 15. Upon assembling the pipe extremities 1 and 14, the annular end faces of the two steel rings are brought practically into contact and form a sealing point or area 10. To enhance the sealing action, a groove 12 receiving the sealing ring 11, is wrought in the end face of the ring 13.

Figure 3A:
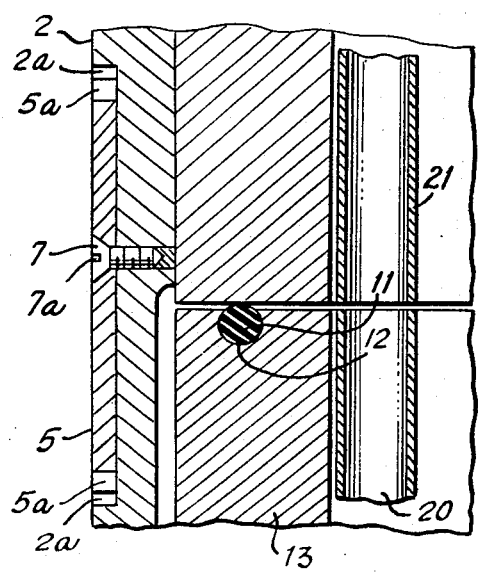
FIG. 3A represents a modification.
Figure 4:
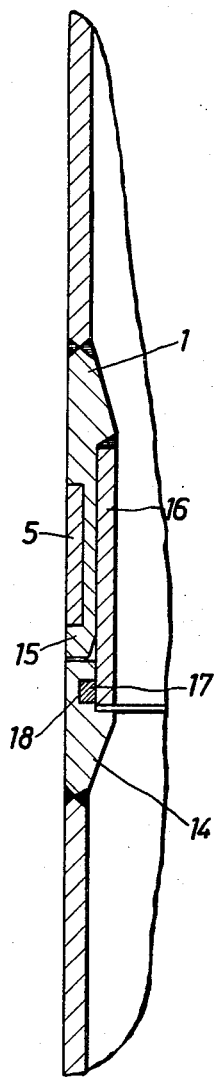
FIG. 4 shows an enlarged partial section corresponding to FIG. 3, with a modified form of the sealing element.

FIG. 4 shows a modified embodiment of the sealing element. In this case, a steel ring 16 which extends along the height of the ring of cogs 15 is welded on the inner side of the pipe portion 1. On the other pipe portion 14, is machined a corresponding step 17, into which the steel ring 16 engages with its front extremity when the joint is closed. At the side of the step 17, a sealing ring 18 which equally enhances the sealing action, is inserted into a groove. Axial grooves 2a receive projections 5a of the band 5 in FIG. 3A.

Figure 3:
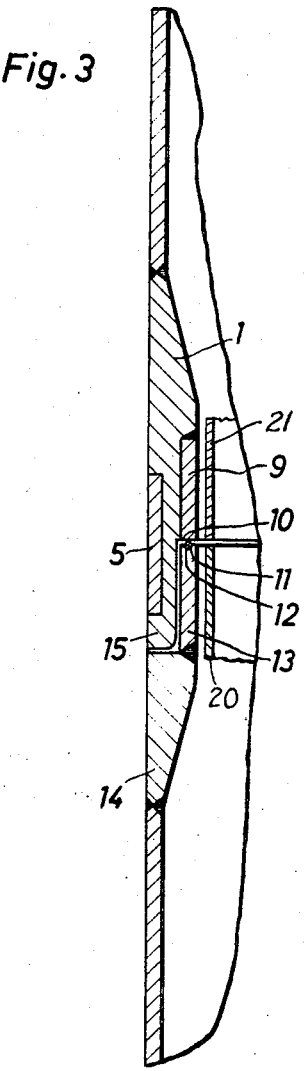

Upon performing the assembling operation, the pipe portions 1 and 14 are moved towards each other until the rings of cogs 2 and 15 engage in each other under full areal contact between their flanks. The snap ring 5 is then placed in the groove 4 and secured in the same. The required hermeticity is assured on the one hand by the full areal contact between the flanks 3 of the rings of cogs 2 and 15, and on the other hand by means of the seal 11 or 18, which seals by means of the steel rings 9 and 13 respectively the steel ring 16 and the step 17, ensures a tight closure against the outside. The coupling according to the invention precludes any play between the rings of cogs 2 and 15 by virtue of the denticulation having oblique flanks, thus establishing a totally uninterrupted flow of force reducing attrition to a minimum. In co-operation with the complementary seal 11, the full areal contact between the cog flanks implies an absolutely air tight and water tight seal, which is an ineluctable presupposition for the production of pressed concrete foundation or bearing piles, and for well boring, since the risk that soiled water coming from above the actual vein or water may penetrate at the coupling point, must be eliminated. Any water penetrating into the boring pipe from the outside is equally very harmful during the concreting of piles. Moreover, the pipe coupling according to the invention offers an opportunity of forcing phreatic or ground water out of the pipe by means of compressed air, and of performing the concreting operation under application of a "bore" piston under compressed air. FIG. 3 also shows how the inner pipes 20, 21 are so arranged that they are almost in contact when the pipe coupling 13 is assembled.

I claim:

1. A releasable coupling for connecting two pipes of a boring string, said coupling comprising an array of angularly equispaced cogs formed on one end of each of said pipes and interfitting complementarily with the cogs of the other pipe, said cogs each having a pair of flanks tapering axially in the direction of the other pipe and receivable in a recess complementary to the cog between the cogs of the other array, said cogs being formed along their external periphery with outwardly open channels aligned to form a circumferential groove in an interfitting condition of said arrays, a circumferential fastening element received in said groove and having a radial thickness at most equal to the radial depth of said groove whereby no portion of said fastening element projects outwardly beyond the peripheries of said pipes, and an axially extending ring inwardly of said cogs and sealingly bridging said pipes upon interfitting of said arrays of cogs, said flanks of said cogs each fully engaging the flanks of a pair of adjoining cogs of the opposing array.

2. The coupling defined in claim 1 wherein said ring includes respective steel ring members formed on each of said pipes along the interior of the respective array of cogs and axially aligned upon interfitting of said arrays to axially seal the coupling, each of said ring members having an axial length equal approximately to half the axial length of said cogs.

3. The coupling defined in claim 2 wherein at least one of said ring members is formed with an axial face confronting the other of said ring members and formed with an annular recess, said coupling further comprising a sealing ring in said recess and clamped between said ring members.

4. The coupling defined in claim 1 wherein said ring is fixed to one of said pipes and said cogs are formed internally with steps forming an annular seat for said ring.

5. The coupling defined in claim 4 wherein an annular recess is formed laterally in the pipe provided with said seat, said coupling further comprising a sealing ring in said annular recess hugging said axially extending ring.

6. The coupling as defined in claim 1, further comprising stop means on said fastening element for limiting displacement thereof relative to said cogs.

7. The coupling defined in claim 6 wherein at least one of said cogs is formed with an axially extending recess flanking said groove and said stop means includes a projection on said fastening element engaging in said axially extending recess.

8. The coupling defined in claim 6 wherein said fastening element is provided with a bore, said stop means including a screw traversing said bore and threadedly engaging said one of said cogs.

9. The coupling defined in claim 1, further comprising inner pipes having their endfaces almost in contact upon interengagement of said array.

10. The coupling defined in claim 1 wherein said cogs are generally trapezoidal and said flanks have inclinations of substantially 3° to 20° to the axis of said pipes.

* * * * *